United States Patent
Chen et al.

(10) Patent No.: US 11,938,923 B1
(45) Date of Patent: Mar. 26, 2024

(54) LONGITUDINAL AND LATERAL VEHICLE MOTION COOPERATIVE CONTROL METHOD BASED ON FAST SOLVING ALGORITHM

(71) Applicant: Tongji University, Shanghai (CN)

(72) Inventors: Hong Chen, Shanghai (CN); Lin Zhang, Shanghai (CN); Rongjie Yu, Shanghai (CN); Hanghang Liu, Shanghai (CN)

(73) Assignee: Tongji University, Shanghai (CN)

( * ) Notice: Subject to any disclaimer, the term of this patent is extended or adjusted under 35 U.S.C. 154(b) by 0 days.

(21) Appl. No.: 18/372,708

(22) Filed: Sep. 26, 2023

(30) Foreign Application Priority Data

Feb. 3, 2023 (CN) .......................... 202310094089.1

(51) Int. Cl.
*B60W 30/045* (2012.01)
*B60W 30/18* (2012.01)

(52) U.S. Cl.
CPC .... *B60W 30/045* (2013.01); *B60W 30/18172* (2013.01); *B60W 2520/26* (2013.01); *B60W 2720/26* (2013.01); *B60W 2720/30* (2013.01)

(58) Field of Classification Search
CPC ....... B60W 30/18172; B60W 2520/26; B60W 2520/263; B60W 2520/266; B60W 2720/26; B60W 2720/263; B60W 2720/266
See application file for complete search history.

(56) References Cited

U.S. PATENT DOCUMENTS

2023/0063613 A1* 3/2023 Gao ...................... B60W 50/14

FOREIGN PATENT DOCUMENTS

| CN | 111158264 A | * | 5/2020 | ............. G05B 17/02 |
| CN | 111158264 A |   | 5/2020 | |

OTHER PUBLICATIONS

Mohamed, Amr; "Design and Development of Advanced Control Techniques for an Unmanned Ground Vehicle"; University of Ontario Institute of Technology; Nov. 2018 (Year: 2018).*
English Translation of CN-111158264-A.*

* cited by examiner

*Primary Examiner* — Anshul Sood
(74) *Attorney, Agent, or Firm* — Bayramoglu Law Offices LLC

(57) ABSTRACT

A longitudinal and lateral vehicle motion cooperative control method based on a fast solving algorithm comprises the following steps: calculating a desired yaw rate according to a steering wheel rotation angle and a current vehicle traveling speed; constructing a nonlinear optimization problem according to the desired yaw rate and a current actual motion state of a vehicle, wherein an objective function of the nonlinear optimization problem is used for tracking the desired yaw rate, and simultaneously for restraining a lateral speed and a tire slip ratio of the vehicle; solving the nonlinear optimization problem to calculate desired slip ratios of four tires; calculating an additional torque of each tire according to an actual slip ratio and the desired slip ratio of the tire; and sending the additional torque of each tire to an actuator of the vehicle for cooperative control.

7 Claims, 6 Drawing Sheets

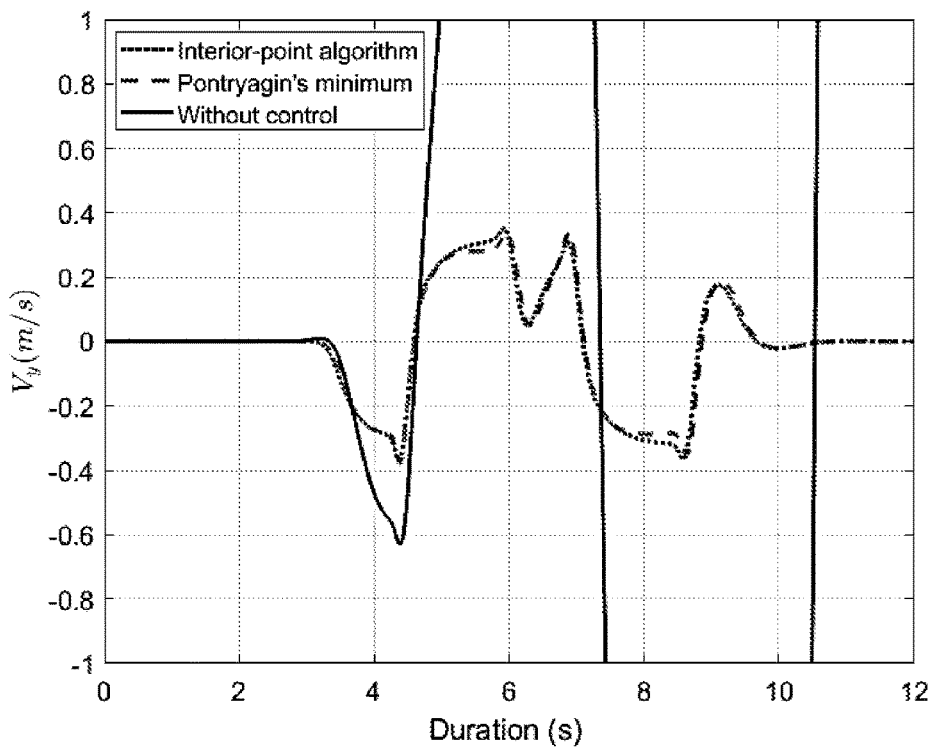
FIG. 7
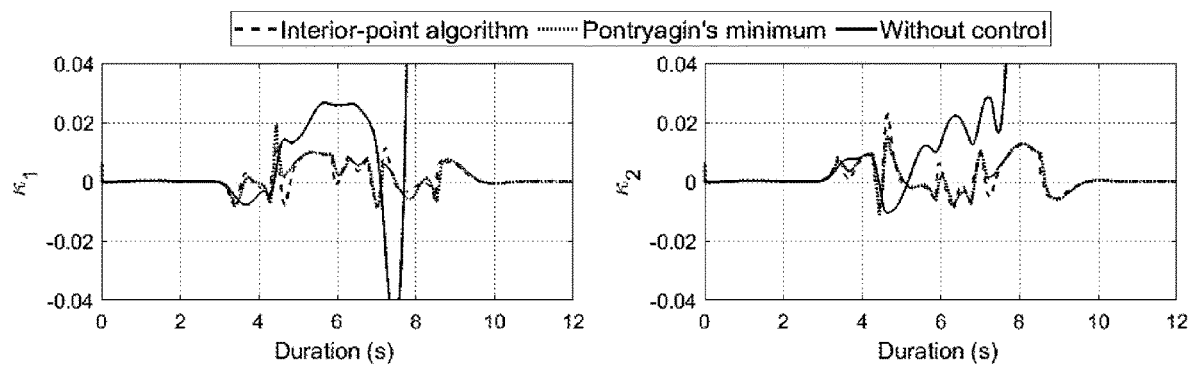
FIG. 8A
FIG. 8B
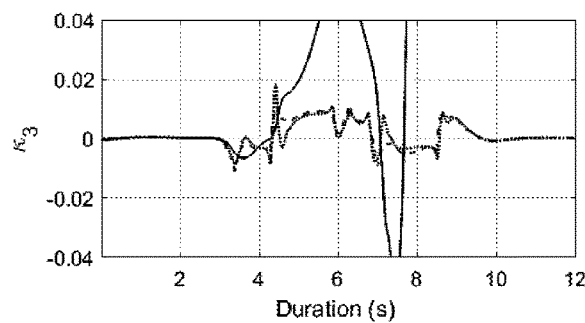
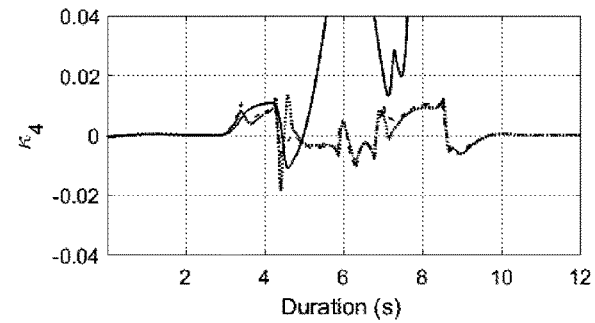
FIG. 8C
FIG. 8D

LONGITUDINAL AND LATERAL VEHICLE MOTION COOPERATIVE CONTROL METHOD BASED ON FAST SOLVING ALGORITHM

CROSS REFERENCE TO THE RELATED APPLICATIONS

This application is based upon and claims priority to Chinese Patent Application No. 202310094089.1, filed on Feb. 3, 2023, the entire contents of which are incorporated herein by reference.

TECHNICAL FIELD

The present invention relates to the technical field of longitudinal and lateral vehicle motion cooperative control, and in particular, to a longitudinal and lateral vehicle motion cooperative control method based on a model predictive control framework.

BACKGROUND

In the case that a driver operates improperly during the vehicle traveling process, such as emergency acceleration and deceleration, emergency steering, etc., the vehicle may deviate from a stable traveling state, and if the vehicle is not controlled at the moment, the vehicle may be further destabilized, leading to an accident. Therefore, a corresponding controller needs to be designed to help the vehicle improve stability. Under extreme working conditions, the vehicle is a complex nonlinear system, and the longitudinal motion and the lateral motion of the vehicle are coupled with each other, so the state of the vehicle is described only by a vehicle dynamics model with high accuracy when a controller is designed so as to meet the requirement of stability control. In addition to this, in consideration of the limited execution ability of the vehicle actuator, the controller also takes into account the constraint on the control input of the vehicle. During the vehicle traveling process, the state of the vehicle in a future period of time needs to be predicted so as to find out the instability risk in time and pull the vehicle back to a normal traveling state. As can be seen from all of the above requirements, the cooperative control of the longitudinal and lateral motions of the vehicle under extreme working conditions can be summarized into a multi-objective optimization problem with constraints, so that the model predictive control is an ideal solution. In another aspect, the vehicle is a very typical fast-change system, so the stability control period of the vehicle is short and the frequency is high. However, in consideration of cost or power consumption and other aspects, the existing vehicle-mounted controllers are often limited in computing capability and cannot meet the real-time requirements. Therefore, in conclusion, the following problems exist in the current cooperative control of the longitudinal and lateral motions of the vehicle based on model predictive control:

1. In the existing solutions, in order to simplify the design of a controller and reduce the calculation complexity, a linearized approximate model is often adopted to describe the motion of a vehicle. However, the vehicle is actually a typical nonlinear time-varying system, and the approximated linear model has problems of reduced accuracy, reduced controller performance and the like after the vehicle enters a highly nonlinear area, so that it is necessary to describe the motion state of the vehicle by means of high-accuracy nonlinearity.

2. In the existing vehicle stability control solutions, the coupling of the longitudinal and lateral motions of the vehicle is not considered. In practice, however, there is a complex nonlinear coupling characteristic for the longitudinal and lateral tire forces of the vehicle. If it is not considered, the vehicle may lose stability under certain extreme working conditions.

3. As the nonlinear constraint optimization problem needs to be solved in the control solution based on model predictive control, the computation amount is large. The traditional solving algorithms (such as interior-point algorithm, sequential quadratic programming, etc.) need a long duration for solving when solving the nonlinear optimization problem, and cannot meet the real-time requirements of vehicle-mounted applications. Therefore, it is necessary to improve the solving method and increase the solving speed, such that the real-time requirements of vehicle-mounted applications can be met.

The Chinese Patent No. CN202010020411.2 discloses a fast solving method based on model predictive control facing vehicle-mounted applications, wherein the solution provides the convenience of solving, the established system model is a low-order single-control-variable system, the vehicle model only considers lateral and yaw motions and does not take the longitudinal motion of the vehicle into consideration, and the tire model is a pure tire sideslip model. In practice, the tire forces of the vehicle are coupled with each other in the longitudinal and lateral directions, and the accuracy of the vehicle model constructed by the solution is poor. In addition, the controller directly generates additional yaw moments which are distributed by an average distribution strategy of the lower-layer controller, so the case that the tires may slip in the actual situation is not considered, and therefore the tire slip cannot be restrained.

SUMMARY

For the problem of controlling the stability of the longitudinal and lateral motions of a vehicle under extreme working conditions, the present invention designs a controller based on a model predictive control principle.

The objective of the present invention can be achieved by the following technical solutions:

Provided is a longitudinal and lateral vehicle motion cooperative control method based on a fast solving algorithm, which comprises the following steps:

calculating a desired yaw rate according to a steering wheel rotation angle and a current vehicle traveling speed;

constructing a nonlinear optimization problem according to the desired yaw rate and a current actual motion state of a vehicle, wherein an objective function of the nonlinear optimization problem is used for tracking the desired yaw rate, and simultaneously for restraining a lateral speed and a tire slip ratio of the vehicle;

solving the nonlinear optimization problem to calculate desired slip ratios of four tires;

calculating an additional torque of each tire according to an actual slip ratio and the desired slip ratio of the tire; and sending the additional torque of each tire to an actuator of the vehicle for cooperative control; wherein fast solving the nonlinear optimization problem based on Pontryagin's minimum principle comprises the following processes:

introducing a relaxation factor to convert a state constraint of the system;

defining a Hamiltonian function $\tilde{H}$ within a prediction horizon, independent variables of the Hamiltonian function being the desired slip ratios $u(k_i)=[u_1(k_i), u_2(k_i), u_3(k_i), u_4(k_i)]^T$ of the four tires;

discretizing a canonical equation of the nonlinear optimization problem to obtain necessary conditions meeting optimal control, and acquiring terminal conditions of the nonlinear optimization problem according to Pontryagin's minimum principle;

performing Taylor expansion on an original Hamiltonian function, and converting the Hamiltonian function $\tilde{H}$ into a multivariate quadratic function related to the independent variables $u(k_i)=[u_1(k_i), u_2(k_i), u_3(k_i), u_4(k_i)]^T$;

assuming $\partial\tilde{H}/\partial u=0$, and solving the multivariate quadratic function to obtain a stationary point $P_s$ of the Hamiltonian function; and the stationary point $P_s$ being a minimum point of the Hamiltonian function $\tilde{H}$, acquiring an optimal explicit control input at each moment, namely the desired slip ratio of each tire.

Furthermore, the desired yaw rate of the vehicle is calculated using a second-order reference model, and a transfer function from a front wheel rotation angle $\delta_f$ to the desired yaw rate $\gamma_{ref}$ of the vehicle is expressed as follows:

$$\frac{\gamma_{ref}}{\delta_f} = K_\gamma \frac{1+\tau_\gamma s}{\frac{1}{\omega_n^2}s^2 + \frac{2\zeta}{\omega_n}s + 1}$$

wherein a stability factor of the vehicle is defined as $$K = -\frac{m(C_f L_f - C_r L_r)}{2C_f C_r L},$$

and a distance between front and rear axles is defined as $L=L_f+L_r$; a natural oscillation frequency of a second-order reference model system is defined as $$w_n = \frac{2}{V_x}\sqrt{\frac{C_f C_r(L-KV_x^2)}{mI_z}},$$

a damping coefficient of the second-order reference model system is $$\zeta = \frac{m(C_f L_f^2 + C_r L_r^2)+(C_f+C_r)I_z}{2\sqrt{LmI_z C_f C_r(L-KV_x^2)}},$$

a yaw-rate steady-state gain is $$K_\gamma = \frac{V_x}{L+KV_x^2},$$

a yaw-rate differential coefficient is defined as $$\tau_\gamma = \frac{mVL_f}{2C_r L},$$

m is a mass of the vehicle, $I_z$ is a rotational inertia of the vehicle about a center of mass, $V_x$ is a longitudinal speed of the vehicle, $L_f$ and $L_r$ represent lengths of front and rear half axles, respectively, and $C_f$ and $C_r$ represent stiffnesses of the front-rear axle tires, respectively.

Furthermore, an upper limit value of the desired yaw rate is defined as $$\gamma_{up} = \left|\frac{\mu g}{V_x}\right|,$$

and a constraint met by the desired yaw rate $\gamma_{ref}$ is $|\gamma_{ref}|\leq \gamma_{up}$, wherein $\mu$ represents a friction coefficient of a road surface, g represents a gravity coefficient, and $V_x$ represents a longitudinal speed of the vehicle.

Furthermore, expressions of the nonlinear optimization problem are as follows:

$$\min L = \sum_{k_i=k+1}^{k+N}[\Gamma_1 L_1(k_i)+\Gamma_2 L_2(k_i)+\Gamma_3 L_3(k_i)+\Gamma_4 L_4(k_i)]$$

$$\text{s.t.} -V_{y,up} \leq x_2(k_i) \leq V_{y,up}$$

$$-u_{up} \leq u(k_i) \leq u_{up}$$

in the formulae, $L_1(k_i)$, $L_2(k_i)$, $L_3(k_i)$, and $L_4(k_i)$, represent objective function sub-terms of a tracked yaw rate, a tracked lateral speed, a control input, and a control input change rate, respectively, $\Gamma_1$, $\Gamma_2$, $\Gamma_3$ and $\Gamma_4$, represent a yaw rate tracking weight coefficient, a lateral line speed tracking weight coefficient, a control input weight coefficient, and a control input change rate weight coefficient, respectively, and $V_{y,up}$ and $u_{up}$ represent an upper limit value of the lateral speed and an upper limit value of the control input, respectively.

Furthermore, a constraint on a side slip angle of the vehicle is defined as follows:

$$\beta_{up} = \left|\mu g\left(\frac{L_r}{V_x^2}+\frac{3}{2}\frac{mL_f}{C_r L}\right)\right|$$

according to a relation between the lateral speed and the side slip angle, the corresponding upper limit value of the lateral speed is obtained as $V_{y,up}=\tan(\beta_{up})V_x$ and a constraint on the lateral speed of the vehicle is obtained as $|V_y|\leq V_{y,up}$;

wherein $\mu$ represents a friction coefficient of a road surface, g represents a gravity coefficient, $V_x$ represents a longitudinal speed of the vehicle, $L_f$ and $L_r$ represent lengths of front and rear half axles, respectively, L represents a distance between front and rear axles, $C_r$ represents a stiffness of the rear axle tires, and m represents a mass of the vehicle.

Furthermore, at each moment $k_i(k+1\leq k_i \leq k+N)$, the objective function sub-terms of the tracked desired yaw rate $\gamma_{ref}$ and the tracked desired lateral speed $V_{y,ref}$ are expressed as follows:

$L_1(k_i)=[x_3(k_i)-\gamma_{ref}]^2$ $L_2(k_i)=[x_2(k_i)-V_{y,ref}]^2$ wherein N represents the prediction horizon, the desired lateral speed is set as $V_{y,ref}=0$, and a constraint on the lateral speed of the vehicle is within a safe range, i.e., $|x_2(k_i)|\leq V_{y,up}$;

the objective function sub-terms of the control input and the wheel control input change rate are expressed as follows:

$$L_3(k_i)=u(k_i-1)^2$$

$$L_4(k_i)=\Delta u(k_i-1)^2$$

a control input input is constrained to $|u(k_i)|u_{up}$, wherein $u_{up}$ represents the upper limit value of the control input.

Furthermore, each objective function sub-term is obtained according to a vehicle dynamics model, and specific steps are as follows:

defining a state vector of the vehicle system as $x=[x_1, x_2, x_3]^T=[V_x, V_y, \gamma]^T$, wherein $V_x$, $V_y$ and $\gamma$ represent the longitudinal speed, the lateral speed and the yaw rate of the vehicle;

defining a control vector of the vehicle system as $u=[u_1, u_2, u_3, u_4]^T=[\tilde{\kappa}_1, \tilde{\kappa}_2, \tilde{\kappa}_3, \tilde{\kappa}_4]^T$, , wherein $\tilde{\kappa}_1, \tilde{\kappa}_2, \tilde{\kappa}_3, \tilde{\kappa}_4$ represent the desired slip ratios of the four tires; and discretizing the vehicle dynamics model by using Euler's discrete method, assuming a sampling duration for discretization to be $T_s$, and acquiring a discretized vehicle dynamics model as follows:

$$x_1(k+1) = \left[x_2(k)x_3(k) + \frac{1}{m}((F_{x1}(k)+F_{x2}(k))\cos\delta_f - (F_{y1}(k)+F_{y2}(k))\sin\delta_f + F_{x3}(k)+F_{x4}(k))\right]2T_s - T_s + x_1(k),$$

$$x_2(k+1) = \left[-x_1(k)x_3(k) + \frac{1}{m}((F_{y1}(k)+F_{y2}(k))\cos\delta_f + (F_{x1}(k)+F_{x2}(k))\sin\delta_f + F_{y3}(k)+F_{y4}(k))\right]T_s + x_2(k),$$

$$x_3(k+1) = \frac{T_s}{I_z}\left(L_f(F_{x1}(k)+F_{x2}(k))\sin\delta_f + L_f(F_{y1}(k)+F_{y2}(k))\cos\delta_f - L_r(F_{y3}(k)+F_{y4}(k)) + \frac{d}{2}(F_{x2}(k)-F_{x1}(k))\cos\delta_f + \frac{d}{2}(F_{x4}(k)-F_{x3}(k)) + \frac{d}{2}(F_{y1}(k)-F_{y2}(k))\sin\delta_f\right) + x_3(k)$$

wherein $F_{xi}$ and $F_{yi}$ represent a longitudinal force and a lateral force of the front tires, respectively, subscripts i=1, 2,3,4 represent a left front wheel, a right front wheel, a left rear wheel, and a right rear wheel of the vehicle, respectively, $L_f$ and $L_r$ represent distances from front and rear axles to a center of mass of the vehicle, respectively, m is a mass of the vehicle, $I_z$ is a rotational inertia of the vehicle about the center of mass, $\delta_f$ represents a front wheel rotation angle of the vehicle, and d represents a distance between the left and right wheels of the vehicle.

Furthermore, the longitudinal force and the lateral force of the vehicle tires are described by using a composite slip ratio nonlinear tire model, and are expressed as follows:

$$F = \begin{cases} \sigma C - \frac{\sigma^2 C^2}{3\mu F_z} + \frac{\sigma^3 C^3}{27\mu^2 F_z^2}, & \sigma \leq \sigma_{sl} \\ \mu F_z, & \sigma \geq \sigma_{sl} \end{cases}$$

wherein $\mu$ represents a friction coefficient of a road surface, $F_z$ represents a vertical load of each tire, C represents a stiffness of a tire force, $$\sigma_{sl} = \left(\frac{3\mu F_z}{C}\right)$$

represents a threshold of a composite slip amount of the tire, and $\sigma$ represents a magnitude of the composite slip amount of the tire, and is calculated as follows:

$$\sigma=\sqrt{\sigma_x^2+\sigma_y^2}$$

wherein $\sigma_x$ and $\sigma_y$ represent longitudinal and lateral slip amounts of each tire, respectively, and are calculated as follows:

$$\sigma_x = \frac{\kappa}{1+\kappa}, \sigma_y = \frac{-\alpha}{1+\kappa}$$

wherein $\kappa$ represents a longitudinal slip ratio of the tire, and can be calculated based on a current longitudinal speed $V_x$ of the vehicle and a rotation speed $\omega$ of the tire:

$$\kappa = \frac{\omega Re - V_x}{V_x}$$

wherein Re represents an effective rolling radius of the tires, and $\alpha$ represents slip angles of the tires comprising the front wheels and the rear wheels, and is calculated as follows:

$$\alpha_f = \frac{V_y + L_f\gamma}{V_x} - \delta_f$$

$$\alpha_r = \frac{V_y - L_r\gamma}{V_x}$$

wherein $\delta_f$ represents the front wheel rotation angle of the vehicle, $\alpha_f$ represents the slip angles of the two front axle tires, and $\alpha_r$ represents the slip angles of the two rear axle tires, and calculations are as follows:

$$F_x = \frac{\sigma_x}{\sigma}F, F_y = \frac{\sigma_y}{\sigma}F.$$

Furthermore, the nonlinear optimization problem, after being fast solved based on Pontryagin's minimum principle, is transformed to find out an optimal initial value of a Lagrangian multiplier, the initial value being able to meet the terminal conditions along optimal necessary conditions;

the optimal initial value of the Lagrangian multiplier is obtained by optimizing and searching through a Nelder-Mead simplex search algorithm, and specific steps are as follows:

outputting an initial value by using the Nelder-Mead simplex search algorithm for iteration;

iterating, based on a discretized vehicle dynamics model, a Hamiltonian function and an optimal control input expression obtained by fast solving, the initial value to obtain a terminal value;

determining the terminal value according to the terminal conditions, and if the terminal value does not meet the terminal conditions, returning to the Nelder-Mead simplex search algorithm for continuous search; and when the Nelder-Mead simplex search algorithm reaches a maximum number of iterations or meets the terminal conditions, outputting the optimal initial value of the Lagrangian multiplier.

Furthermore, the additional torque of each tire is calculated by using PID control, and an expression is as follows:

$$\Delta T_i = K_P(\bar{\kappa}_i - \kappa_i) + K_I \int_{t=0}^{0.1} (\bar{\kappa}_i - \kappa_i) dt$$

Wherein subscripts i=1,2,3,4 represent different tire numbers, $\Delta T_i$ represents the additional torque of each tire, $K_p$ and $K_I$ represent a proportionality coefficient and an integral coefficient, respectively, and $\kappa_i$ and $\bar{\kappa}_i$ represent an actual slip ratio at a current moment and the desired slip ratio of each tire obtained by an upper-layer controller, respectively.

Compared with the prior art, the present invention has the following beneficial effects:

1) The present invention expands the dimensionality of the vehicle system to three dimensions, simultaneously expands the dimensionality of the control input to four dimensions, and also provides a fast solving algorithm based on Pontryagin's minimum principle in order to increase the solving speed and meet the real-time requirements of vehicle-mounted applications. In the present invention, the Pontryagin's minimum principle is expanded into a high-order multi-control input system, a solving method is also provided, the expression of the optimal control law of the high-order nonlinear optimization problem is obtained, and the optimal control law meets the necessary and sufficient conditions of a minimum point, thereby fast solving the high-order nonlinear problem. Compared with the traditional numerical optimization solving algorithms, under the similar solving accuracy, the solving efficiency can be greatly increased, and the real-time performance is improved.

2) For the vehicle stability control under extreme working conditions, the present invention designs a model predictive controller based on a nonlinear vehicle dynamics model. Specifically, the degree of freedom of the longitudinal motion of the vehicle is considered in the vehicle model, so that the model precision is greatly improved compared with a traditional linearized approximate model and a second-order model, and the vehicle stability under extreme working conditions can be effectively improved. The coupling nonlinear characteristics of the longitudinal and lateral forces of the tires are considered in the tire model, so that the tire force calculation accuracy and the vehicle future state prediction accuracy under extreme working conditions are further improved compared with a traditional pure tire sideslip model.

3) The present invention designs a PID controller in a lower-layer controller. The additional torque of the motor is calculated according to the desired tire slip ratio generated by the upper-layer controller and the current actual slip ratio of the vehicle, so that the stability of the vehicle is improved, and the tire slip ratio can be effectively restrained, thereby preventing the vehicle from slipping.

BRIEF DESCRIPTION OF THE DRAWINGS

FIG. 7 is a graph comparing lateral speeds under a double-lane change working condition;

FIGS. 8A-8D show graphs comparing slip ratios of four tires under a double-lane change working condition, wherein FIGS. 8A-8D are schematic diagrams showing respective slip ratios of the four tires;

DETAILED DESCRIPTION OF THE EMBODIMENTS

The present invention is described in detail below with reference to the accompanying drawings and the specific examples. The following examples are implemented on the premise of the technical solutions of the present invention, and detailed embodiments and specific operation procedures are given. However, the protection scope of the present invention is not limited to the following examples.

Figure 1:
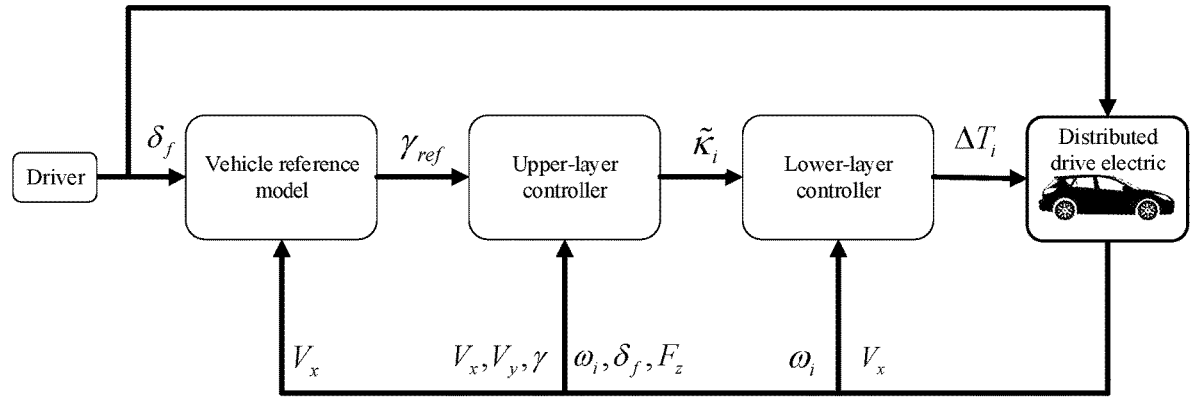
FIG. 1 is a block diagram showing the process of a cooperative control method designed in the present invention.

Based on the block diagram showing the controllers of the present invention, as shown in FIG. 1, a driver, when driving a vehicle, makes a corresponding steering wheel rotation angle, a reference model calculates a desired yaw rate according to the driven steering wheel rotation angle, and limits an original desired yaw rate according to a friction coefficient of a road surface, and then sends the desired yaw rate to the controllers. The controllers calculate a corresponding control input according to the desired yaw rate and a current actual motion state of the vehicle, the control input being desired slip ratios of four tires. As the desired slip ratios cannot be directly executed by a vehicle actuator, a PID controller is designed in the lower-layer controller to calculate an additional torque of each tire to track the desired slip ratio.

In order to verify the model predictive controller and the fast solving algorithm thereof designed in the present invention, a working condition of vehicle stability control on a low-adhesion road surface is selected for verification. Firstly, a dynamics model capable of considering the longitudinal and lateral motions of the vehicle is derived; secondly, a proper vehicle model is selected from CarSim and corresponding parameters are acquired; then, a simulation working condition is established on a low-adhesion road surface; then, a model predictive controller is designed according to the deduced vehicle dynamics model and the objective function, and the control input is solved by using the fast solving algorithm; and finally, the method of the present invention is verified in a joint simulation experiment, and is compared with the traditional IPOPT solving algorithm to illustrate the beneficial effects of the method of the present invention.

The method specifically comprises the following steps:

In the first step, a controller is designed based on a fast solving algorithm, Specifically, the required control problem is described based on a model predictive control principle and is described as a nonlinear optimization problem, and the constructed nonlinear optimization problem is solved in real time based on the fast solving algorithm.

The controlled objective of the method is a four-wheel independent-drive distributed drive electric vehicle, the traveling road surface is a road surface with a low friction coefficient, and the control objective is to calculate the additional torques of four tires according to the current motion state of the vehicle, such that the vehicle can track the desired yaw rate, and simultaneously restrain the lateral speed and the tire slip ratios. The main design process is described below. Firstly, a proper mathematical model is established for the four-wheel independent-drive distributed drive electric vehicle.

1) Vehicle motion model

Figure 2:
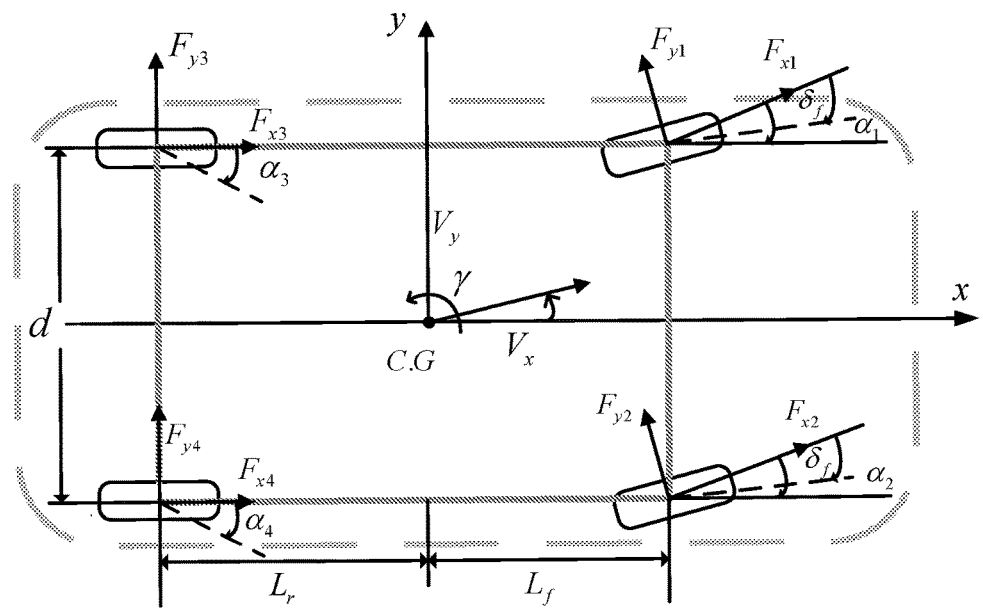
FIG. 2 is a schematic diagram of a vehicle dynamics model.

In the present invention, as the coupling nonlinear characteristics of the longitudinal and lateral motions of the vehicle need to be considered, a three-degree-of-freedom vehicle model which can simultaneously consider the longitudinal, lateral and yaw motions of the vehicle is adopted. As shown in FIG. 2, the vehicle dynamics model can be described by the following mathematical equations:

$$\dot{V}_x = \gamma V_y + \frac{1}{m}((F_{x1} + F_{x2})\cos\delta_f - (F_{y1} + F_{y2})\sin\delta_f + F_{x3} + F_{x4}), \quad (1)$$

$$\dot{V}_y = -\gamma V_x + \frac{1}{m}((F_{y1} + F_{y2})\cos\delta_f + (F_{x1} + F_{x2})\sin\delta_f + F_{y3} + F_{y4}),$$

$$\dot{\gamma} = \frac{1}{I_z}\bigg(L_f(F_{x1} + F_{x2})\sin\delta_f + L_f(F_{y1} + F_{y2})\cos\delta_f - L_r(F_{y3} + F_{y4}) +$$

$$\frac{d}{2}(F_{x2} - F_{x1})\cos\delta_f + \frac{d}{2}(F_{x4} - F_{x3}) + \frac{d}{2}(F_{y1} - F_{y2})\sin\delta_f\bigg)$$

wherein $\dot{V}_x$, $\dot{V}_y$ and $\dot{\gamma}$ represent derivatives of a longitudinal speed, a lateral speed and a yaw rate of the vehicle, respectively, $V_x$, $V_y$ and $\gamma$ represent the longitudinal speed, lateral speed and yaw rate of the vehicle, $F_{xi}$ and $F_{yi}$ represent a longitudinal force and a lateral force of the front tires, respectively, subscripts i=1,2,3,4 represent a left front wheel, a right front wheel, a left rear wheel and a right rear wheel of the vehicle, respectively, $L_f$ and $L_r$ represent distances from the front and rear axles to the center of mass of the vehicle, respectively, m is the mass of the vehicle, $I_z$ is the rotational inertia of the vehicle about the center of mass, $\delta_f$ represents a front wheel rotation angle of the vehicle, and d represents a distance between the left and right wheels of the vehicle, respectively.

2) Establishment of composite tire slip model

In the present invention, in order to consider the coupling nonlinear characteristics of the longitudinal and lateral tire forces of the vehicle, a composite slip ratio nonlinear tire model is adopted to describe the longitudinal and lateral tire forces of the vehicle, and the tire model can be expressed as follows:

$$F = \begin{cases} \sigma C - \frac{\sigma^2 C^2}{3\mu F_z} + \frac{\sigma^3 C^3}{27\mu^2 F_z^2}, & \sigma \leq \sigma_{sl} \\ \mu F_z, & \sigma \geq \sigma_{sl} \end{cases} \quad (2)$$

wherein μ represents a friction coefficient of a road surface, $F_z$ represents a vertical load of each tire, C represents a stiffness of a tire force, $$\sigma_{sl} = \left(\frac{3\mu F_z}{C}\right)$$

represents a threshold of a composite slip amount of the tire, and σ represents the magnitude of the composite slip amount of the tire, and is calculated as follows:

$$\sigma = \sqrt{\sigma_x^2 + \sigma_y^2}. \quad (3)$$

wherein $\sigma_x$ and $\sigma_y$ represent longitudinal and lateral slip amounts of each tire, respectively, and are calculated as follows:

$$\sigma_x = \frac{\kappa}{1+\kappa}, \sigma_y = \frac{-\alpha}{1+\kappa}, \quad (4)$$

in the formula, κ represents a longitudinal slip ratio of the tire, and can be calculated based on a current longitudinal speed $V_x$ of the vehicle and a rotation speed ω of the tire:

$$\kappa = \frac{\omega \text{Re} - V_x}{V_x}. \quad (5)$$

wherein Re represents the effective rolling radius of the tires, and α represents slip angles of the tires comprising the front wheels and the rear wheels, and is calculated as follows:

$$\alpha_f = \frac{V_y + L_f \gamma}{V_x} - \delta_f, \quad (6)$$

$$\alpha_r = \frac{V_y - L_r \gamma}{V_x}.$$

wherein $\alpha_f$ represents the slip angles of the two front axle tires, i.e., the two tires with subscripts 1 and 2, and $\alpha_r$ represents the slip angles of the two rear axle tires, i.e., the two tires with subscripts 3 and 4. According to the above definition, the longitudinal and lateral component forces of the tires can be calculated as follows:

$$F_x = \frac{\sigma_x}{\sigma}F, F_y = \frac{\sigma_y}{\sigma}F. \quad (7)$$

3) Establishment of vehicle reference model

In the present invention, the controller mainly functions to control the vehicle such that it can track the desired yaw rate while restraining the lateral speed and the tire slip ratios of the vehicle, and thus it is necessary to calculate the desired yaw rate in real time according to the motion state of the vehicle, and therefore a reference model of the vehicle is used herein to calculate the desired yaw rate. In the present invention, the desired yaw rate of the vehicle is calculated using a second-order reference model, and a transfer function from a front wheel rotation angle $\delta_f$ to the desired yaw rate $\gamma_{ref}$ of the vehicle is expressed as follows:

$$\frac{r_{ref}}{\delta_f} = K_\gamma \frac{1 + \tau_\gamma s}{\frac{1}{\omega_n^2}s^2 + \frac{2\zeta}{\omega_n}s + 1} \quad (8)$$

wherein a stability factor of the vehicle is defined as $$K = -\frac{m(C_f L_f - C_r L_r)}{2C_f C_T L},$$

and a distance between front and rear axles is defined as $L=L_f+L_r$; a natural oscillation frequency of a second-order reference model system is defined as $$w_n = \frac{2}{V_x}\sqrt{\frac{C_f C_r (L - K V_x^2)}{m I_z}},$$

a damping coefficient of the second-order reference model system is $$\zeta = \frac{m(C_f L_f^2 + C_r L_r^2) + (C_f + C_r) I_z}{2\sqrt{L m I_z C_f C_r (L - K V_x^2)}},$$

a yaw-rate steady-state gain is $$K_\gamma = \frac{V_x}{L + K V_x^2},$$

a yaw-rate differential coefficient is defined as $$\tau_\gamma = \frac{m V L_f}{2 C_r L},$$

and $C_f$ and $C_r$ in the above expression represent stiffnesses of the front-rear axle tires, respectively.

In the model, a preliminary desired yaw rate signal is obtained through calculation. However, as the adhesion ability of the road surface is limited, the actual adhesion ability of the road surface also needs to be considered. Upper and lower limit values of the desired yaw rate need to be calculated according to the actual adhesion ability of the road surface. The upper limit value of the desired yaw rate is defined as $$\gamma_{up} = \left|\frac{\mu g}{V}\right|,$$

then a constraint met by the desired yaw rate $\gamma_{ref}$ is defined as $|\gamma_{ref}| \leq \gamma_{up}$. In addition, stability constraints of the vehicle also need to be considered. As the stability of the vehicle can be shown by the lateral speed, the lateral speed of the vehicle needs to be constrained to be within a safe range, and a constraint on a side slip angle of the vehicle is defined as follows:

$$\beta_{up} = \left|\mu g \left(\frac{L_r}{V_x^2} + \frac{3}{2}\frac{m L_f}{C_r L}\right)\right|. \quad (9)$$

On the basis, the corresponding upper limit value of the lateral speed can be obtained as $V_{y,up}=\tan(\beta_{up})V_x$ according to the relation between the lateral speed and the side slip angle, and then a constraint on the lateral speed can be obtained as $|V_y| \leq V_{y,up}$.

5) Controller design

According to the vehicle dynamics model, the longitudinal motion, the lateral motion and the yaw motion of the vehicle need to be considered simultaneously in the controller. To facilitate the design of the controller, the state vector of the system is firstly defined as $x=[x_1, x_2, x_3]^T=[V_x, V_y, \gamma]^T$, and the control vector of the system is defined as $u=[u_1, u_2, u_3, u_4]^T=[\tilde{\kappa}_1, \tilde{\kappa}_2, \tilde{\kappa}_3, \tilde{\kappa}_4]^T$, i.e., the desired slip ratios of the four tires. In order to facilitate the design and formula derivation of the controller, the vehicle dynamics model needs to be discretized firstly by using Euler's discrete method, and it is assumed that a sampling duration for discretization is $T_s$, a discretized vehicle dynamics model is obtained as follows:

$$x_1(k+1) = \left[x_2(k)x_3(k) + \frac{1}{m}((F_{x1}(k) + F_{x2}(k))\cos\delta_f - (F_{y1}(k) + F_{y2}(k))\sin\delta_f + F_{x3}(k) + F_{x4}(k))\right] \quad (10)$$

$$2T_s - T_s + x_1(k),$$

$$x_2(k+1) = \left[-x_1(k)x_3(k) + \frac{1}{m}((F_{y1}(k) + F_{y2}(k))\cos\delta_f + (F_{x1}(k) + F_{x2}(k))\sin\delta_f + F_{y3}(k) + F_{y4}(k))\right]T_s +$$

$$x_2(k),$$

$$x_3(k+1) = \frac{T_s}{I_z}\bigg(L_f(F_{x1}(k) + F_{x2}(k))\sin\delta_f +$$

$$L_f(F_{y1}(k) + F_{y2}(k))\cos\delta_f - L_r(F_{y3}(k) + F_{y4}(k)) + \frac{d}{2}(F_{x2}(k) - F_{x1}(k))\cos\delta_f +$$

$$\frac{d}{2}(F_{x4}(k) - F_{x3}(k)) + \frac{d}{2}(F_{y1}(k) - F_{y2}(k))\sin\delta_f\bigg) + x_3(k).$$

In the controller, both of the tracked desired yaw rate $\gamma_{ref}$ and the tracked desired lateral speed $V_{y,ref}$ need to be considered simultaneously, and at each moment $k_i(k+1 \leq k_i \leq k+N)$, objective function sub-terms can be expressed as follows:

$$L_1(k_i)=[x_3(k_i)-\gamma_{ref}]^2,$$

$$L_2(k_i)=[x_2(k_i)-V_{y,ref}]^2, \quad (11)$$

wherein N represents the prediction horizon. In the present invention, for the purpose of improving the stability of the vehicle, the desired lateral speed is set as $V_{y,ref}=0$; namely, the magnitude of the lateral speed is restrained as much as possible. Furthermore, for safety reasons, over the entire prediction horizon, the lateral speed of the vehicle should be constrained to be within a safe range, i.e., $|x_2(k_i)| \leq V_{y,up}$. On the basis of considering the control objective, the restraint on the tire slip ratios and the change rates thereof need to be considered as well, so the latter two terms of the objective function sub-terms can be expressed as follows:

$$L_3(k_i)=u(k_i-1)^2,$$

$$L_4(k_i)=\Delta u(k_i-1)^2. \quad (12)$$

For the purpose of preventing tires from slipping and fully utilizing the limited motor torque, the control input needs to be constrained to be within a safe range, i.e., $|u_2(k_i)| \leq u_{up}$, wherein $u_{up}$ represents an upper limit value of the control input. According to the above definition of the objective function sub-terms and constraints thereof, the nonlinear optimization problem in the controller can be obtained as follows:

$$\min L = \sum_{k_i=k+1}^{k+N} [\Gamma_1 L_1(k_i) + \Gamma_2 L_2(k_i) + \Gamma_3 L_3(k_i) + \Gamma_4 L_4(k_i)] \quad (13)$$

$$\text{s.t.} \quad -\nabla_{y,up} \leq x_2(k_i) \leq \nabla_{y,up},$$

$$-u_{up} \leq u(k_i) \leq u_{up},$$

in the formulae, $\Gamma_1$, $\Gamma_2$, $\Gamma_3$ and $\Gamma_4$ represent a yaw rate tracking weight coefficient, a lateral line speed tracking weight coefficient, a control input weight coefficient, and a control input change rate weight coefficient, respectively.

6) Fast solving algorithm based on Pontryagin's minimum principle

As can be seen from the definition of the Pontryagin's minimum principle, the Pontryagin's minimum principle cannot directly process the state constraint of the system, so a relaxation factor is introduced herein to convert the state constraint of the system:

$$\zeta(k_i)=v(1+e^{\tau(1+x_2(k_i))})^{-1}+v(1+e^{\tau(1+x_2(k_i))})^{-1}. \quad (14)$$

wherein $\tau$ represents the degree of relaxation of the relaxation factor, $v$ is set as a large positive number, and then it is ensured that the state can be constrained to be within a safe range. After the relaxation factor is introduced, the second sub-term of the original objective function becomes:

$$L_2'(k_i)=L_2(k_i)+\zeta(k_i). \quad (15)$$

at this time, a new nonlinear optimization problem is obtained as follows:

$$\min L = \sum_{k_i=k+1}^{k+N} [\Gamma_1 L_1(k_i) + \Gamma_2 L_2'(k_i) + \Gamma_3 L_3(k_i) + \Gamma_4 L_4(k_i)] \quad (16)$$

$$\text{s.t.} \quad -u_{up} \leq u(k_i) \leq u_{up},$$

at this time, it can be seen that the original optimization problem is transformed into an optimization problem without the state constraint. On the basis, the Hamiltonian function within the prediction horizon $k+1 \leq k_i \leq k+N+1$ is defined as follows:

$$H(x(k_i), u(k_i))=\Gamma_1 L_1(k_i)+\Gamma_2 L_2'(k_i)+\Gamma_3 L_3(k_i)+\Gamma_4 L_4(k_i)+ \lambda(k_i)^T \tilde{F}(k_i), \quad (17)$$

wherein $\lambda(k_i)=[\lambda_1(k_i), \lambda_2(k_i), \lambda_3(k_i)]^T$ represents a Lagrangian multiplier, and $\tilde{F}(k_i)=[\tilde{F}_1(k_i), \tilde{F}_2(k_i), \tilde{F}_3(k_i)]^T$, is defined as follows:

$$\tilde{F}_1(k_i) = \quad (18)$$
$$\left[ x_2(k_i)x_3(k_i) + \frac{1}{m}((F_{x1}(x(k_i), u_1(k_i)) + F_{x2}(x(k_i), u_2(k_i)))\cos\delta_f - \right.$$
$$(F_{y1}((x(k_i), u_1(k_i)) + F_{y2}(x(k_i), u_2(k_i)))\sin\delta_f +$$
$$\left. F_{x3}(x(k_i), u_3(k_i)) + F_{x4}(x(k_i), u_4(k_i))) \right],$$

$$\tilde{F}_2(k_i) = \left[ -x_1(k_i)x_3(k_i) + \right.$$
$$\frac{1}{m}((F_{y1}(x(k_i), u_1(k_i)) + F_{y2}(x(k_i), u_2(k_i)))\cos\delta_f + (F_{x1}(x(k_i), u_1(k_i)) +$$
$$\left. F_{x2}(x(k_i), u_2(k_i)))\sin\delta_f + F_{y3}(x(k_i), u_3(k_i)) + F_{y4}(x(k_i), u_4(k_i))) \right],$$

$$\tilde{F}_3(k_i) =$$
$$\frac{1}{I_z}\Bigl( L_f(F_{x1}(x(k_i), u_1(k_i)) + F_{x2}(x(k_i), u_2(k_i)))\sin\delta_f + L_f(F_{y1}(x(k_i), u_1(k_i)) +$$
$$F_{y2}(x(k_i), u_2(k_i)))\cos\delta_f - L_r(F_{y3}(x(k_i), u_3(k_i)) + F_{y4}(x(k_i), u_4(k_i))) +$$
$$\frac{d}{2}(F_{x2}(x(k_i), u_2(k_i)) - F_{x1}(x(k_i), u_1(k_i)))\cos\delta_f +$$
$$\frac{d}{2}(F_{x4}(x(k_i), u_4(k_i)) - F_{x3}(x(k_i), u_3(k_i))) +$$
$$\frac{d}{2}(F_{y1}(x(k_i), u_1(k_i)) - F_{y2}(x(k_i), u_2(k_i)))\sin\delta_f \Bigr).$$

According to the Pontryagin's minimum principle, the canonical equation of the problem is $\dot{\lambda}=-\partial H/\partial x$. Similar to the discretization process of the model, the canonical equation is discretized as well, wherein the sampling duration is the same as $T_s$, and then the necessary conditions for meeting the optimal control are as follows:

$$\lambda(k_i) = \lambda(k_i + 1) + \frac{\partial H}{\partial x}\Big|_{k_i+1} T_s. \quad (19)$$

Meanwhile, according to the Pontryagin's minimum principle, the terminal conditions for the problem are as follows:

$$\lambda(k+N+1)=0 \quad (20)$$

At each moment, the Hamiltonian function needs to take a minimum under optimal control:

$$H(u^*(k_i), \lambda^*(k_i)) \leq H(u(k_i), \lambda^*(k_i)). \quad (21)$$

The optimal control input for the current moment can be obtained if the Lagrangian multiplier at each moment, the current system state, and the control input for the last moment are known. Then, as can be seen from the definition of the Hamiltonian function in formula, the Hamiltonian function is a highly nonlinear function related to independent variables $u(k_i)=[u_1(k_i), u_2(k_i), u_3(k_i), u_4(k_i)]^T$, it is very difficult to solve an analytical solution of the function, and even the analytical solution does not exist. Therefore, in the present invention, Taylor expansion is performed on the original Hamiltonian function, and then the Hamiltonian function after Taylor expansion is as follows:

$$\tilde{H}(x(k_i), u(k_i))=p_1 u(k_i)^T u(k_i)+(p_2+p_3)u(k_i)+g(x(k_i), u(k_i-1)), \quad (22)$$

wherein, $$p_1 = \Gamma_3 + \Gamma_4, \quad p_2 = -2\Gamma_4 u(k_i - 1)^T, \quad (23)$$

-continued $$p_3 = \lambda(k_i)^T \left[ \frac{\partial \tilde{F}}{\partial u_1}, \frac{\partial \tilde{F}}{\partial u_2}, \frac{\partial \tilde{F}}{\partial u_3}, \frac{\partial \tilde{F}}{\partial u_4} \right]_{k_i-1}.$$

in the Hamiltonian function, a constant remainder term can be expressed as follows:

$$g(x(k_i), u(k_i-1)) = \Gamma_1(x_3(k_i) - \gamma_{ref})^2 + \qquad (24)$$
$$\Gamma_2((x_2(k_i) - V_{y,ref})^2 + \zeta(k_i)) + \Gamma_4 u(k_i-1)^T u(k_i-1) +$$
$$\lambda(k_i)^T \tilde{F}(k_i) - \lambda(k_i)^T \left[ \frac{\partial \tilde{F}}{\partial u_1}, \frac{\partial \tilde{F}}{\partial u_2}, \frac{\partial \tilde{F}}{\partial u_3}, \frac{\partial \tilde{F}}{\partial u_4} \right]_{k_i-1} u(k_i-1).$$

As can be seen from the above process, the Hamiltonian function $\tilde{H}$ is a multivariate quadratic function related to independent variables $u(k_i) = [u_1(k_i), u_2(k_i), u_3(k_i), u_4(k_i)]^T$. Thus, the original optimization problem is transformed into the problem of acquiring a minimum point of the multivariate quadratic function. Assuming equation $\partial \tilde{H}/\partial u = 0$, the equation is solved to obtain a stationary point $P_s$ of the Hamiltonian function as follows:

$$\frac{\partial \tilde{H}}{\partial u} = 0 \Rightarrow P_s = \frac{p_2^T + p_3^T}{-2p_1}. \qquad (25)$$

at the stationary point, a Hessian matrix is calculated for the Hamiltonian function as follows $$W(P_s) = \begin{bmatrix} 2p_1 & 0 & 0 & 0 \\ 0 & 2p_1 & 0 & 0 \\ 0 & 0 & 2p_1 & 0 \\ 0 & 0 & 0 & 2p_1 \end{bmatrix}. \qquad (26)$$

in the model predictive control, the weight coefficients of all the sub-terms in the objective function are greater than zero, so $p_1$ in formula is also greater than zero, and thus the Hessian matrix $W(P_s)$ is a positively definite matrix at the stationary point. As can be seen from higher mathematics, the stationary point $P_s$ is the minimum point of the Hamiltonian function $\tilde{H}$. Therefore, an optimal explicit control input at each moment can be expressed as follows:

$$u_j^*(k_i) = \frac{\lambda(k_i)^T \frac{\partial \tilde{F}}{\partial u_j}\bigg|_{k_i-1} - 2\Gamma_4 u_j(k_i-1)}{-2p_1}, \qquad (27)$$

wherein subscripts j=1,2,3,4 represent the numbers of different control inputs On the basis of the optimal explicit control input, it is necessary to consider a constraint on the control input itself, and therefore the optimal control input after the constraint can be expressed as follows:

$$u_j^*(k_i) = \begin{cases} -u_{up}, & \text{if } u_j^*(k_i) \leq -u_{up} \\ u_j^*(k_i), & \text{if } -1 < u_j^*(k_i) < 1 \\ u_{up}, & \text{if } u_j^*(k_i) \geq u_{up}. \end{cases} \qquad (28)$$

Thereafter, the desired slip ratio for each tire can be expressed as $\tilde{\kappa}_j = u_j^*(k+1)$. Through the above process, the original nonlinear optimization problem in the model predictive control is transformed to find out an optimal initial value of a Lagrangian multiplier, the initial value being able to meet the terminal conditions of formula along optimal necessary conditions of formula . Therefore, the original optimal control problem can be expressed by the conversion of the Pontryagin's minimum principle as follows:

$$\lambda^*(k) = \arg \min_{\lambda(k) \in \mathbb{R}^3} \|\lambda(k+N+1)\|. \qquad (29)$$

Figure 3:
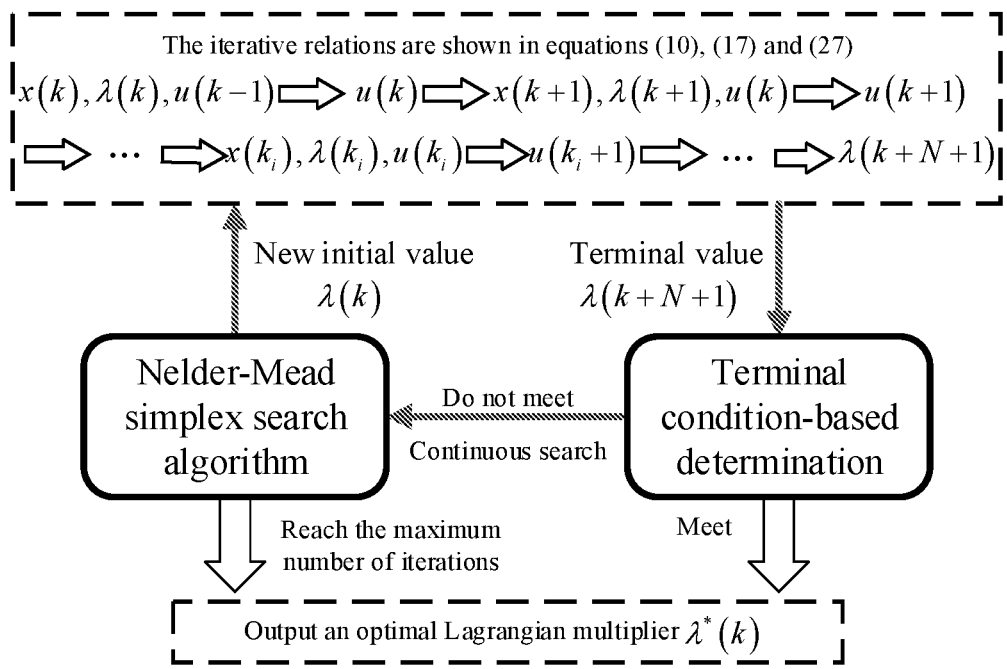
FIG. 3 is a schematic diagram showing an iterative process based on Pontryagin's minimum principle and a Nelder-Mead simplex search algorithm.

Once the optimal initial value is found, an optimal control sequence can be obtained through an iterative relation. For the search problem of the optimal initial value, a Nelder-Mead simplex optimization algorithm can be adopted for searching, and the iterative relation is given in FIG. 3. Specific steps are as follows:

outputting an initial value by using the Nelder-Mead simplex search algorithm for iteration;

iterating, based on a discretized vehicle dynamics model, a Hamiltonian function and an optimal control input expression obtained by fast solving, the initial value to obtain a terminal value;

determining the terminal value according to the terminal conditions, and if the terminal value does not meet the terminal conditions, returning to the Nelder-Mead simplex search algorithm for continuous search; and when the Nelder-Mead simplex search algorithm reaches a maximum number of iterations or meets the terminal conditions, outputting the optimal initial value of the Lagrangian multiplier.

For the original optimal control problem, the number of independent variables is 4×N, and for the transformed problem, the number of independent variables is only 3, so it can be seen that the number of the independent variables is greatly decreased, and in this case, the solving speed can be greatly increased, and the solving duration can be shortened.

7) Lower-layer torque distribution controller

As can be seen from the above design process, the optimum control input found by the model predictive controller is actually the desired tire slip ratio value, and the control input cannot be directly executed by the motor. Therefore, it is necessary to design a lower-layer torque distribution controller to calculate the additional torque of the motor based on the actual slip ratios and the desired slip ratio of the tires. In the present invention, a PID controller which is widely used is adopted to design a lower-layer torque distribution controller, and the additional torque of each tire can be expressed as follows:

$$\Delta T_i = K_P(\tilde{\kappa}_i - \kappa_i) + K_I \int_{t=0}^{0.1} (\tilde{\kappa}_i - \kappa_i) dt \qquad (30)$$

wherein subscripts i=1,2,3,4 represent different tire numbers, $\Delta T_i$ represents the additional torque of each tire, $K_p$ and $K_I$ represent a proportionality coefficient and an integral coefficient, respectively, and $\kappa_i$ and $\tilde{\kappa}_i$ represent an actual slip ratio at a current moment and the desired slip ratio of each tire obtained by an upper-layer controller, respectively.

Construction of vehicle simulation model: the vehicle model simulates a real controlled objective, and the main function is to accurately simulate the characteristics of the longitudinal and lateral motions and the yaw motion of an actual vehicle.

In the present invention, as the joint simulation is adopted, the selection of the vehicle model and the construction of the simulation working condition are mainly used in CarSim.

Firstly, a typical passenger vehicle model is selected, then relevant parameters of the model are modified and obtained, and parameters of the vehicle model are added into a Simulink simulation model. The main model parameters of the vehicle include the mass of the vehicle, the distance between front and rear axles, the tire sideslip stiffness, and the like. After the corresponding vehicle model and parameters are selected, a corresponding simulation working condition needs to be constructed, and the traveling route, the traveling environment, the driver model and the like of the vehicle can be selected in the simulation working condition. In the present invention, the stability of the vehicle is controlled by the additional torques of the four tires, so a driver model carried in CarSim is selected, the motion state parameters of the vehicle are read into Simulink, and the simulation working condition on a low-adhesion road surface is constructed based on the selected vehicle model.

Verification and comparison of simulation experiment

In order to verify the effectiveness of the method of the present invention, a vehicle stability control simulation experiment on a low-adhesion road surface with a road surface friction coefficient of $\mu=0.35$ is adopted for comparative verification. For the solving algorithm for solving the speed contrast, a traditional interior-point (IPOPT) algorithm is adopted to carry out a contrast simulation experiment. In the simulation experiment, the vehicle parameters and the controller parameters are shown in Tables 1 and 2, respectively.

TABLE 1

Vehicle parameter table

| Symbol | Physical description | Numerical value/unit |
|---|---|---|
| m | Mass of vehicle | 1430/kg |
| $R_e$ | Radius of wheel | 0.325/m |
| $L_f$ | Distance from center of mass of vehicle to front axle | 1.05/m |
| $L_r$ | Distance from center of mass of vehicle to rear axle | 1.61/m |
| d | Distance between left and right wheels | 1.55/m |
| $C_f$ | Front wheel tire sideslip stiffness | 90700/N · rad$^{-1}$ |
| $C_r$ | Rear wheel tire sideslip stiffness | 109000/N · rad$^{-1}$ |
| $I_z$ | Rotational inertia of vehicle around z-axis | 2059.2/kg · m$^{-2}$ |
| $I_w$ | Rotational inertia of wheel | 1.68/kg · m$^{-2}$ |

TABLE 2

Controller parameter table

| Symbol | Physical description | Numerical value/unit |
|---|---|---|
| $\Gamma_1$ | Yaw rate tracking weight coefficient | 2.25 |
| $\Gamma_2$ | Lateral speed tracking weight coefficient | 0.53 |
| $\Gamma_3$ | Control input weight coefficient | 0.05 |
| $\Gamma_4$ | Control input change rate weight coefficient | 0.18 |
| $u_{up}$ | Upper limit of control input | 0.1 |
| $T_S$ | Sampling duration | 0.01s |
| N | Prediction horizon | 10 |

TABLE 2-continued

Controller parameter table

| Symbol | Physical description | Numerical value/unit |
|---|---|---|
| $K_P$ | Proportionality coefficient of lower-layer torque distribution controller | 100 |
| $K_I$ | Integral coefficient of lower-layer torque distribution controller | 10 |

Figure 4:
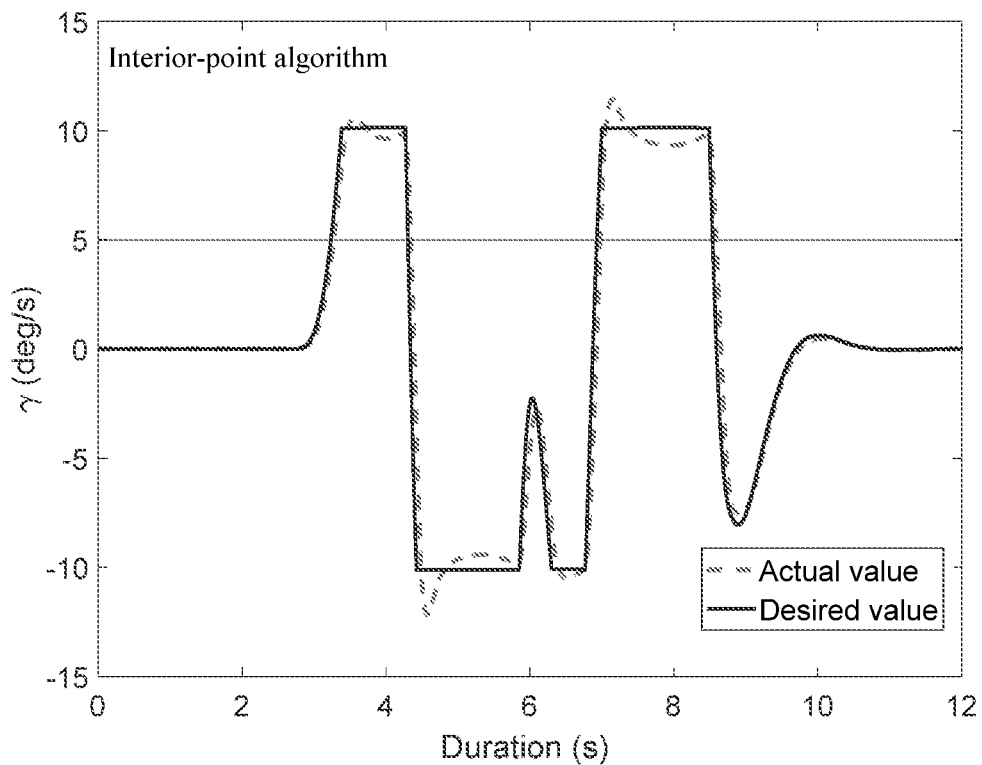
FIG. 4 is a graph showing the control effect obtained from solving based on a traditional interior-point algorithm.
Figure 5:
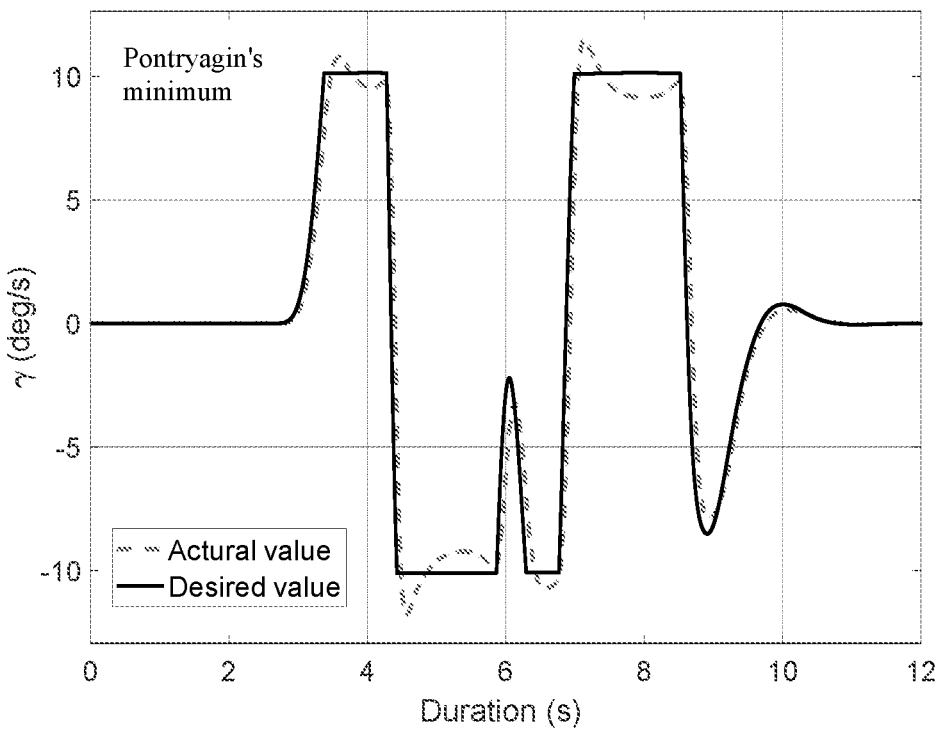
FIG. 5 is a graph showing the control effect obtained from solving based on Pontryagin's minimum principle as designed in the present invention.
Figure 6:
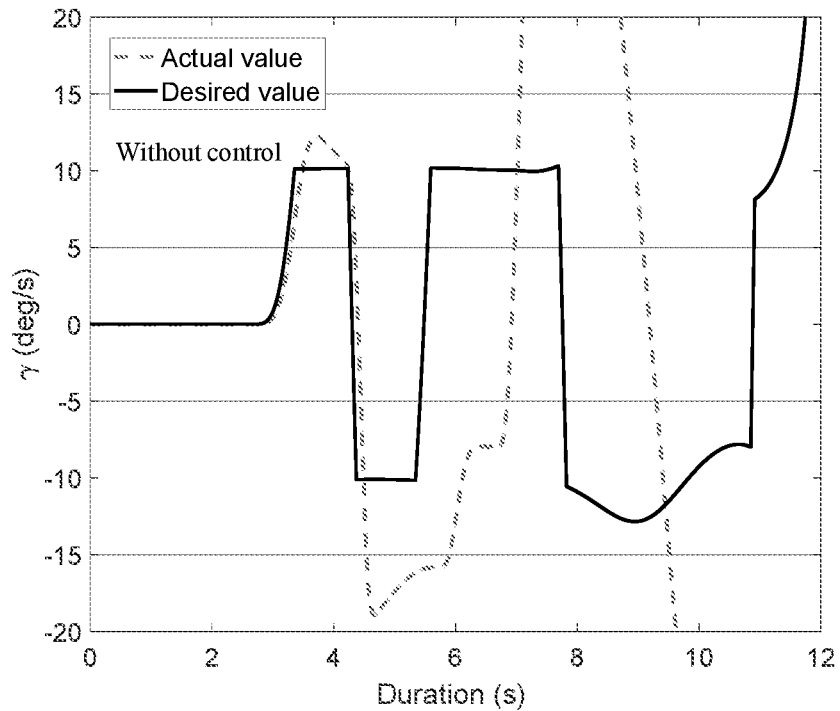
FIG. 6 is a graph showing the control effect when a controller turns off and does not apply control.

Double-lane change working condition experiment:

In the set of simulations, the vehicle speed was kept at 70 km/h and was kept constant throughout the entire working condition. FIGS. 4 and 5 respectively show the control effect obtained from solving based on the traditional interior-point algorithm and the control effect obtained based on the Pontryagin's minimum principle-based solving algorithm in the present invention. As can be seen from the figures, the two solving algorithms can control the vehicle to track the desired yaw rate, thereby effectively improving the maneuverability and the stability of the vehicle. FIG. 6 shows the effect graph for tracking the yaw rate of the vehicle when the controllers are turned off, and it can be seen that the vehicle cannot track the desired yaw rate at all, and the vehicle is out of control due to an excessive yaw rate, and therefore vehicle will rotate uncontrollably. FIG. 7 shows the effect graph comparing the lateral speeds of the vehicle under a double-lane change working condition, and it can be seen that the lateral speed of the vehicle can be restrained within a small range under the action of the controllers, thereby ensuring the stability of the vehicle. And when the controllers are turned off, the vehicle may lose stability due to a large lateral speed. FIGS. 8A-8D show the graph comparing the slip ratios of the four tires under the entire double-lane change working condition. It can be seen that the tire slip ratios of the vehicle can be restrained within a small range under the action of the controllers, thereby preventing the vehicle from losing stability due to tire slip. When the controllers are turned off, the tire slip ratios cannot be restrained within a small range, and in this case, the vehicle may lose stability due to an excessive slip ratio. In conclusion, with the help of the controllers designed in the present invention, the vehicle can keep the traveling stability under the entire double-lane change working condition, and the tire slip ratios can be restrained within a small range. The result proves the effectiveness of the controllers designed in the present invention and the fast solving algorithm thereof.

Figure 9:
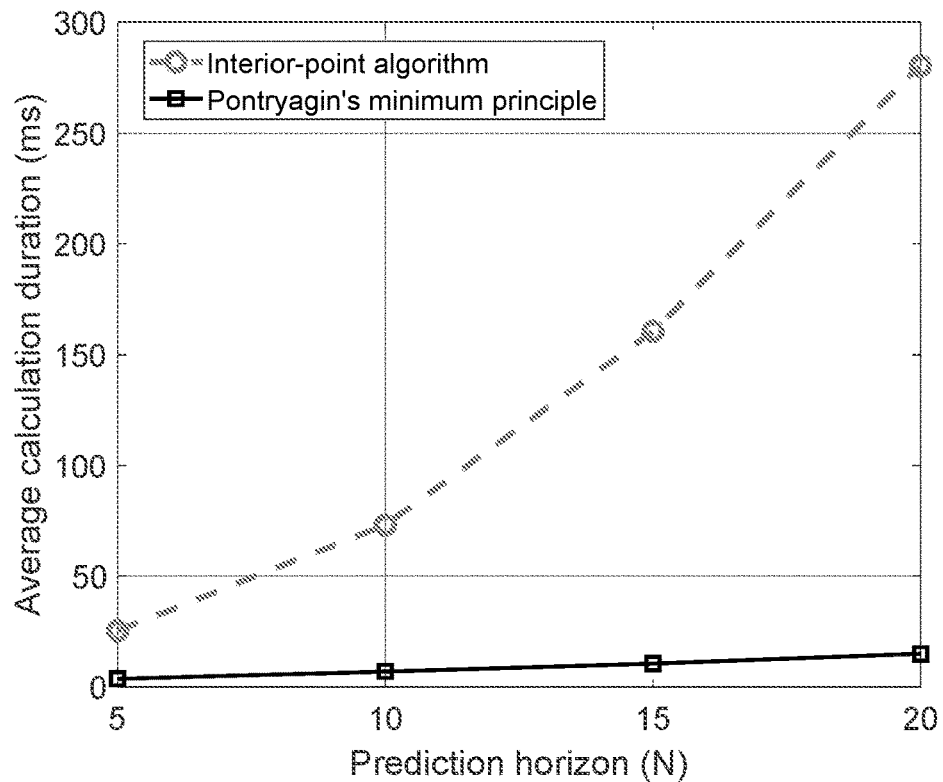
FIG. 9 is a graph comparing average solving durations for two solving algorithms in different prediction horizons.
Figure 10:
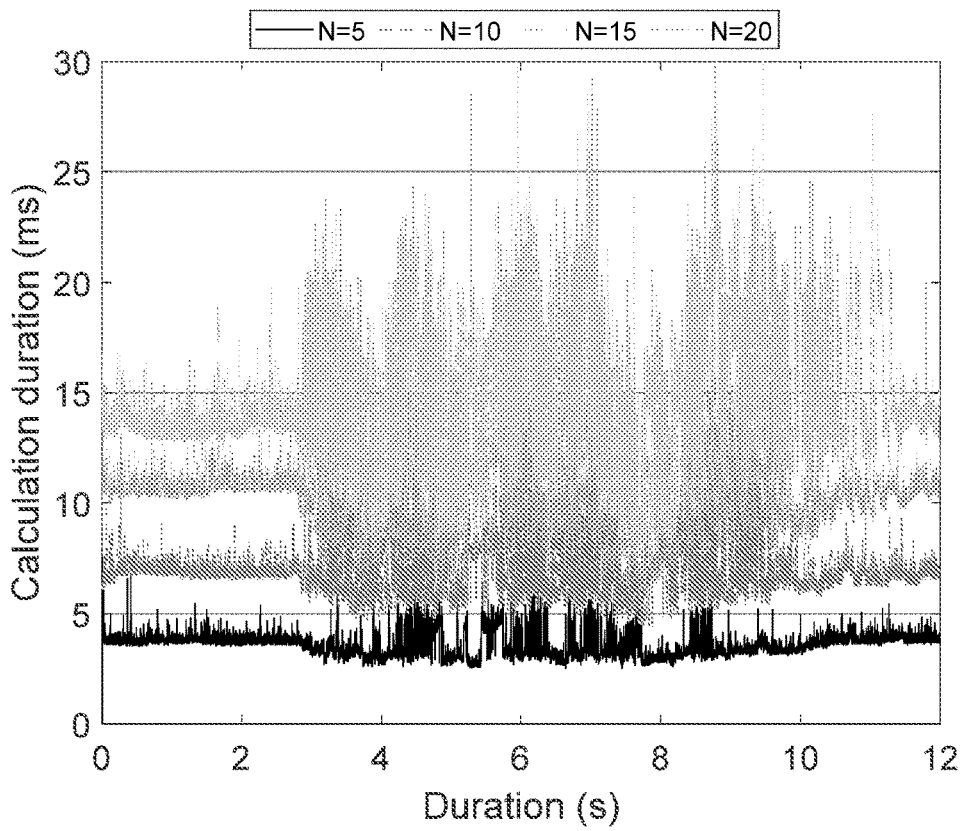
FIG. 10 is a graph comparing instantaneous solving durations for a traditional interior-point algorithm in different prediction horizons.
Figure 11:
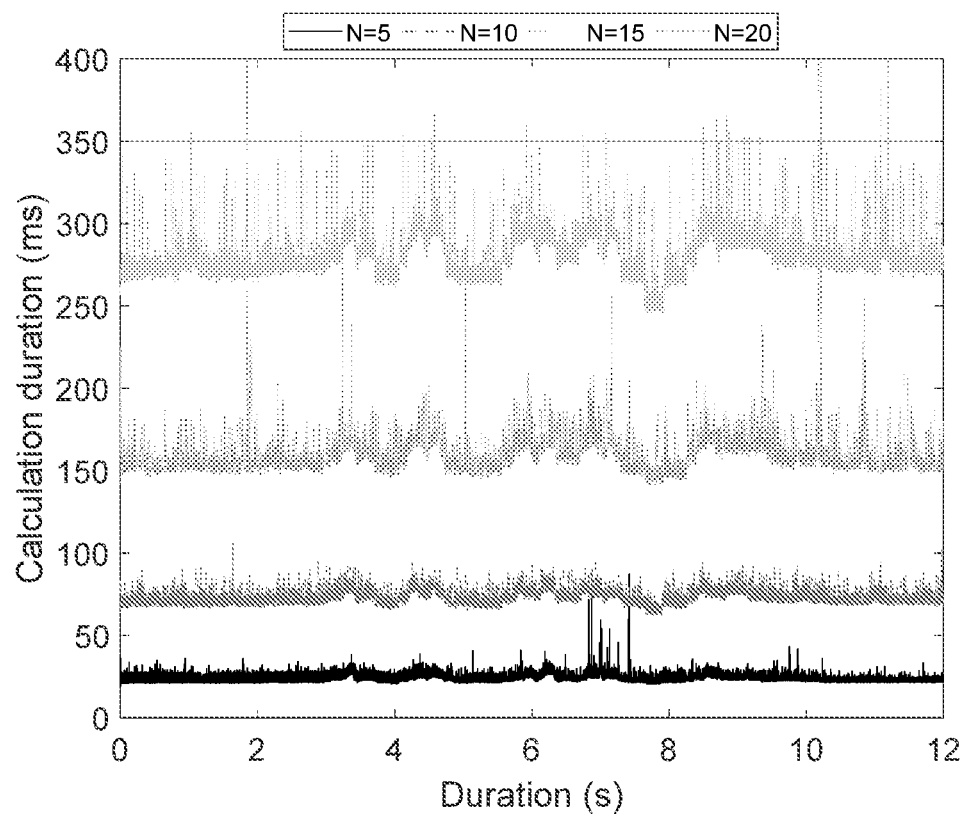
FIG. 11 is a graph comparing instantaneous solving durations for Pontryagin's minimum principle-based solving algorithm in different prediction horizons.

FIG. 9 shows average calculation durations for two solving algorithms in different prediction horizons. As can be seen from the figure, under the same prediction horizon, the average solving duration for the fast solving algorithm designed in the present invention is far shorter than that of the traditional interior-point algorithm, namely, the optimization problem can be solved at a higher speed. And as the prediction horizon increases, the average solving duration for the traditional interior-point algorithm increases exponentially with the increase of the prediction horizon. In contrast, the average solving duration for the fast solving algorithm designed in the present invention increases linearly with the increase of the prediction horizon. FIGS. 10 and 11 show the instantaneous solving durations for the fast solving algorithm designed in the present invention and the traditional interior-point algorithm in different prediction horizons, respectively. It can be seen that under the same prediction horizon, the solving speed of the fast solving algorithm designed in the present invention is about 10 times faster than that of the traditional interior-point algorithm.

The results show that the fast solving algorithm designed in the present invention can solve the optimization problem at a higher speed, which fully embodies the superiority of the fast solving algorithm designed in the present invention.

The detailed description above illustrates preferred examples of the present invention. It should be appreciated that numerous modifications and changes can be made by those of ordinary skills in the art according to the concept of the present invention without creative efforts. Therefore, the technical solutions that can be obtained by those skilled in the art through logical analysis, reasoning or limited experiments based on the prior art according to the concepts of the present invention should fall within the protection scope determined by the claims.

What is claimed is:

1. A longitudinal and lateral vehicle motion cooperative control method based on a fast solving algorithm, comprising the following steps:
    calculating a desired yaw rate according to a steering wheel rotation angle and a current vehicle traveling speed;
    constructing a nonlinear optimization problem according to the desired yaw rate and a current actual motion state of a vehicle, wherein an objective function of the nonlinear optimization problem is configured for tracking the desired yaw rate, and simultaneously for restraining a lateral speed and a tire slip ratio of the vehicle;
    solving the nonlinear optimization problem to calculate desired slip ratios of four tires;
    calculating an additional torque of each tire according to an actual slip ratio and the desired slip ratio of the tire; and
    sending the additional torque of each tire to an actuator of the vehicle for a cooperative control; wherein
    solving the nonlinear optimization problem based on Pontryagin's minimum principle including the following processes:
    introducing a relaxation factor to convert a state constraint of a system;
    defining a Hamiltonian function $\tilde{H}$ within a prediction horizon, independent variables of the Hamiltonian function being the desired slip ratios of the four tires;
    discretizing a canonical equation of the nonlinear optimization problem to obtain necessary conditions meeting an optimal control, and acquiring terminal conditions of the nonlinear optimization problem according to Pontryagin's minimum principle;
    performing Taylor expansion on an original Hamiltonian function, and converting the Hamiltonian function $\tilde{H}$ into a multivariate quadratic function;
    assuming $\partial \tilde{H}/\partial u=0$, and solving the multivariate quadratic function to obtain a stationary point $P_s$ of the Hamiltonian function; and
    the stationary point $P_s$ being a minimum point of the Hamiltonian function $\tilde{H}$, acquiring an optimal explicit control input at each moment, namely the desired slip ratio of each tire.

2. The longitudinal and lateral vehicle motion cooperative control method according to claim 1, wherein the desired yaw rate of the vehicle is calculated using a second-order reference model, and a transfer function from a front wheel rotation angle $\delta_f$ to the desired yaw rate $\gamma_{ref}$ of the vehicle is expressed as follows:

$$\frac{\gamma_{ref}}{\delta_f} = K_\gamma \frac{1+\tau_\gamma s}{\frac{1}{w_n^2}s^2 + \frac{2\zeta}{w_n}s + 1}$$

wherein a stability factor of the vehicle is defined as $$K = -\frac{m(C_f L_f - C_r L_r)}{2C_f C_T L},$$

and a distance between front and rear axles is defined as $L=L_f+L_r$; a natural oscillation frequency of a second-order reference model system is defined as $$w_n = \frac{2}{V_x}\sqrt{\frac{C_f C_r (L-KV_x^2)}{mI_z}},$$

a damping coefficient of the second-order reference model system is $$\zeta = \frac{m(C_f L_f^2 + C_r L_r^2) + (C_f + C_r)I_z}{2\sqrt{LmI_z C_f C_r(L-KV_x^2)}},$$

a yaw-rate steady-state gain is $$K_\gamma = \frac{V_x}{L+KV_x^2},$$

a yaw-rate differential coefficient is defined as $$\tau_\gamma = \frac{mVL_f}{2C_r L},$$

m is a mass of the vehicle, $I_z$ is a rotational inertia of the vehicle about a center of mass, $V_x$ is a longitudinal speed of the vehicle, $L_f$ and $L_r$ represent lengths of front and rear half axles, respectively, and $C_f$ and $C_r$ represent stiffnesses of front-rear axle tires, respectively.

3. The longitudinal and lateral vehicle motion cooperative control method according to claim 1, wherein an upper limit value of the desired yaw rate is defined as $$\gamma_{up} = \left|\frac{\mu g}{V_x}\right|,$$

and a constraint met by the desired yaw rate $\gamma_{ref}$ is $|\gamma_{ref}| \leq \gamma_{up}$, wherein $\mu$ represents a friction coefficient of a road surface, g represents a gravity coefficient, and $V_x$ represents a longitudinal speed of the vehicle.

4. The longitudinal and lateral vehicle motion cooperative control method according to claim 1, wherein expressions of the nonlinear optimization problem are as follows:

$$\min L = \sum_{k_i=k+1}^{k+N}[\Gamma_1 L_1(k_i) + \Gamma_2 L_2(k_i) + \Gamma_3 L_3(k_i) + \Gamma_4 L_4(k_i)]$$

-continued $$\text{s.t.} \quad -\nabla_{y,up} \le x_2(k_i) \le \nabla_{y,up}$$

$$-u_{up} \le u(k_i) \le u_{up}$$

in the formulae, $L_1(k_i)$, $L_2(k_i)$, $L_3(k_i)$ and $L_4(k_i)$ represent objective function sub-terms of a tracked yaw rate, a tracked lateral speed, a control input, and a control input change rate, respectively, $\Gamma_1$, $\Gamma_2$, $\Gamma_3$ and $\Gamma_4$ represent a yaw rate tracking weight coefficient, a lateral line speed tracking weight coefficient, a control input weight coefficient, and a control input change rate weight coefficient, respectively, $V_{y,up}$ and $u_{up}$ represent an upper limit value of the lateral speed and an upper limit value of the control input, respectively, N represents the prediction horizon, and κ represents an actual slip ratio at a current moment, and $\kappa_i$ represents an actual slip ratio at a current moment of a tire represented by the subscript of i.

5. The longitudinal and lateral vehicle motion cooperative control method according to claim 4, wherein a constraint on a side slip angle of the vehicle is defined as follows:

$$\beta_{up} = \left| \mu g \left( \frac{L_r}{V_x^2} + \frac{3}{2} \frac{mL_f}{C_r L} \right) \right|$$

according to a relation between the lateral speed and the side slip angle, the corresponding upper limit value of the lateral speed is obtained as $V_{y,up}=\tan(\beta_{up})V_x$ and a constraint on the lateral speed of the vehicle is obtained as $|V_y| \le V_{y,up}$;

wherein μ represents a friction coefficient of a road surface, g represents a gravity coefficient, $V_x$ represents a longitudinal speed of the vehicle, $L_f$ and $L_r$ represent lengths of front and rear half axles, respectively, L represents a distance between front and rear axles, $C_r$ represents a stiffness of rear axle tires, and m represents a mass of the vehicle.

6. The longitudinal and lateral vehicle motion cooperative control method according to claim 1, wherein the nonlinear optimization problem, after being fast solved based on Pontryagin's minimum principle, is transformed to find out an optimal initial value of a Lagrangian multiplier, the initial value allowed to meet the terminal conditions along optimal necessary conditions;

the optimal initial value of the Lagrangian multiplier is obtained by optimizing and searching through a Nelder-Mead simplex search algorithm, and steps are as follows:

outputting an initial value by using the Nelder-Mead simplex search algorithm for iteration;

iterating, based on a discretized vehicle dynamics model, a Hamiltonian function and an optimal control input expression obtained by fast solving, the initial value to obtain a terminal value;

determining the terminal value according to the terminal conditions, and if the terminal value does not meet the terminal conditions, returning to the Nelder-Mead simplex search algorithm for continuous search; and when the Nelder-Mead simplex search algorithm reaches a maximum number of iterations or meets the terminal conditions, outputting the optimal initial value of the Lagrangian multiplier.

7. The longitudinal and lateral vehicle motion cooperative control method according to claim 1, wherein the additional torque of each tire is calculated by using PID control, and an expression is as follows:

$$\Delta T_i = K_P(\tilde{\kappa}_i - \kappa_i) + K_I \int_{t=0}^{0.1} (\tilde{\kappa}_i - \kappa_i) dt$$

wherein subscripts i=1,2,3,4 represent different tire numbers, $\Delta T_i$ represents the additional torque of each tire, $K_p$ and $K_I$ represent a proportionality coefficient and an integral coefficient, respectively, and $\kappa_i$ and $\tilde{\kappa}_i$ represent an actual slip ratio at a current moment and the desired slip ratio of each tire obtained by an upper-layer controller, respectively, and t represents time.

\* \* \* \* \*